No. 744,942. PATENTED NOV. 24, 1903.
H. R. STEWART.
GUIDE FOR FISHING HOOKS OR BAIT.
APPLICATION FILED NOV. 6, 1902.
NO MODEL.
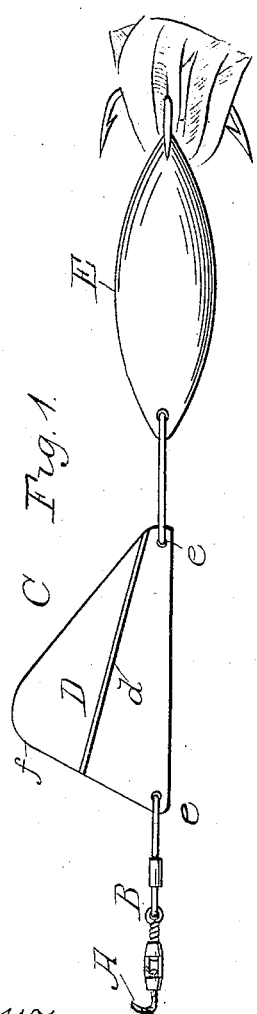
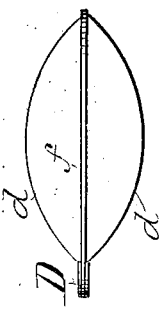
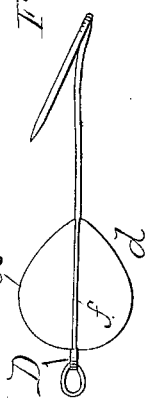
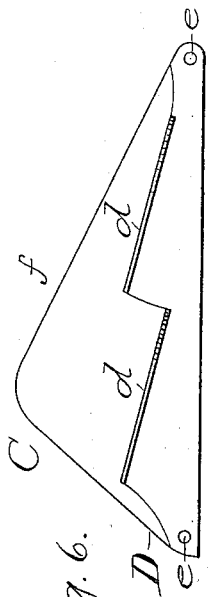
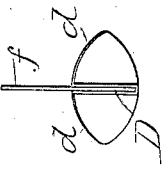
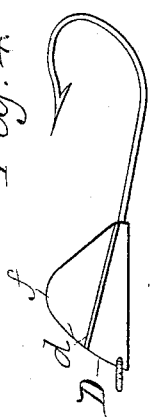
Witnesses:
E. K. Lundy.
E. M. Hart.
Inventor:
Hugh R. Stewart.
By Frank D. Thomason
Atty.
THE NORRIS PETERS CO., PHOTO-LITHO., WASHINGTON, D. C.

No. 744,942. Patented November 24, 1903.

UNITED STATES PATENT OFFICE.

HUGH R. STEWART, OF CHICAGO, ILLINOIS.

GUIDE FOR FISHING HOOKS OR BAIT.

SPECIFICATION forming part of Letters Patent No. 744,942, dated November 24, 1903.

Application filed November 6, 1902. Serial No. 130,284. (No model.)

*To all whom it may concern:*

Be it known that I, HUGH R. STEWART, a citizen of the United States, and a resident of Chicago, in the county of Cook and State of Illinois, have invented certain new and useful Improvements in Guides for Fishing Hooks or Bait, of which the following is a full, clear, and exact description of the same.

My invention relates to fishing-tackle; and its object is to provide simple, cheap, and effective means for holding the natural bait or the artificial devices used as bait in a normally non-rotatable position while being moved through the water or permit the said artificial bait when constructed with such an end in view to revolve without twisting the fish-line.

A further and equally important object of my invention is to enable the fisherman when trolling or casting either to keep the bait traveling on or near the surface of the water or when reversed end for end diving into the water, as required in deep-water fishing. This I accomplish by the means hereinafter fully described, and as particularly pointed out in the claims.

In the drawings, Figure 1 is a side view of my invention, showing parts of fishing-tackle attached thereto. Fig. 2 is a front edge view. Fig. 3 is a top edge view. Fig. 4 is a side view of a modified form of said invention. Fig. 5 is a top edge view of the same. Fig. 6 is a side view of yet another modification of my invention.

Referring to the drawings, it will be observed that my invention is adapted to be secured to or near the end of a fishing-line A when used for trolling or casting. If desired, this connection may be accomplished by a suitable swivel-coupling B, or it may be secured direct to the same. My invention or improved guide C has a body consisting of a central vertical plate D, which has suitable eyes *e e* in or near its forward and rear edges at points intersected by the line of draft and which, preferably nearer its lower edge, is provided with laterally-projecting longitudinally-disposed fins *d d*. These fins are preferably of corresponding shape and are arranged so as to project from the opposite vertical sides of the body in a plane inclined downward from its forward to its rear edge at a suitable angle to the line of draft, which, as above stated, is substantially indicated by an imaginary line striking through the centers of the eyes *e e*. The portion of the body D of the guide below the fins *d d* or keel is preferably less in depth than the height of the body disposed above the plane of said fins, which latter is adapted to operate as a dorsal fin *f* and as the device is drawn through the water to maintain it in an upright position.

I do not desire to be confined to any particular shape of the fins or keel of my invention, as they may be greatly modified without departing from the spirit of my invention. In the drawings the fins and keel are all shown as tapering toward the forward end of the guide and their edges are made to approach the rear end of the same at a more abrupt angle. This is a mere matter of choice, however, and it may be changed so as to suit the idea of the manufacturer.

The bait, whether it be a "spoon" or revolving bait E or a stationary hook, is preferably secured to the rear end of the guide by means of a suitable coupling G, substantially as shown; but whether the bait be revolving or stationary when it is drawn through the water with the guide in such position that its tapering or forward end is in advance no motion of the bait will affect or twist the fishing-line, because after the guide commences to move it rights itself and thereafter will not revolve. When the guide is used with its forward end in advance, the action of the water on the under side of the fins *d d* will always keep it near the surface of the water. This is especially desirable when fishing over weed-beds, whether trolling or casting. When it is desired, however, to use the guide for deep-water fishing, the guide is reversed end for end, and as it is drawn through the water the pressure of the latter on the upper surface of the inclined fins causes it to dive into the water to a depth where the power of the line of draft is equaled by the pressure of the water upon the upper surface of the fins, or vice versa. It will therefore be apparent that the more inclined the fins *d d* are the greater the depth to which the guide will dive, together with the bait which is attached thereto. With a fishing-line of great length the depth to which the guide and the bait may dive into the water is considerable, and to a much greater extent than any known device for this purpose the guide and the bait will while in motion maintain their deep-water course.

When the guide is used for casting, it will be noticed that the guide will always present a flat surface as it falls into the water and stops the plunge of the bait into the same, as now happens before the fisherman has an opportunity to reel in.

When the guide has the hook made rigid therewith or attached thereto by flexible connection not of a revolving character, the hook as the guide moves through the water will always be maintained in a given relative position thereto. As a consequence of this fact the bait when it falls into the water will as soon as the guide begins to move assume the position in which it was secured to the hook and retain the same. As the bait is generally fastened to the hook with a view to its being moved through the water in a natural position, the advantage of this feature of the invention to attract and temp the fish is apparent.

What I claim as new, and desire to secure by Letters Patent, is as follows:

1. A guide for fishing-tackle consisting of a non-rotatable device arranged edgewise to the line of draft and having side fins set at an inclined plane to said line of draft, in combination with fishing-tackle connected to the rear end of the same.

2. A guide for fishing-tackle consisting of a normally non-rotatable device having a suitable dorsal fin and arranged edgewise to the line of draft, and side fins set at an inclined plane to said line of draft, in combination with fishing-tackle secured to the rear end of the same.

3. A guide for fishing-tackle consisting of a normally non-rotatable device having a vertically-disposed body arranged edgewise to the line of draft, and side fins secured thereto mediate the upper and lower edges of said body and arranged at an inclined plane to said line of draft, in combination with fishing-tackle secured to the rear end of the same.

4. A guide for fishing-tackle consisting of a normally non-rotatable device having a vertically-disposed body arranged edgewise to the line of draft, and side fins secured to and projecting from the sides thereof nearer the lower edge of the same, which are set or arranged at an angle to said line of draft, in combination with fishing-tackle secured to the rear end of the same.

5. A guide for fishing-tackle consisting of a normally non-rotatable device having a vertically-disposed body arranged edgewise to the line of draft and provided with side fins set at an inclined plane to said line of draft, and means at its forward end to which the fish-line is attached, in combination with fishing-tackle attached to the rear end thereof.

6. A guide for fishing-tackle consisting of a normally non-rotating device having a vertically-disposed body having eyes at each end in the same plane as the line of draft, and provided with side fins set at an inclined plane to the line of draft.

7. A guide for fishing-tackle consisting of a normally non-rotatable device having a vertically-disposed body having eyes at each end in the same plane as the line of draft, and side fins secured to and projecting from the sides thereof nearer the lower edge of the same, which are set or arranged at an angle to the line of draft.

HUGH R. STEWART.

Witnesses:
HARVEY STRICKLER,
FRANK D. THOMASON.